H. A. HUMPHREY.
Improvement in Casters for Stove-Legs, &c.
No. 115,322.            Patented May 30, 1871.
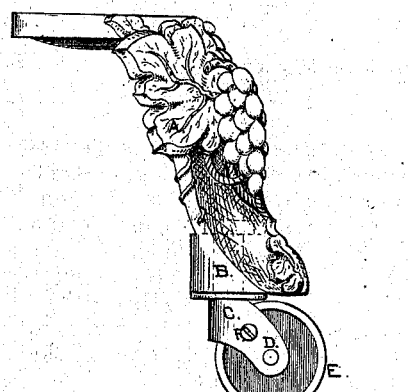
FIG. I.
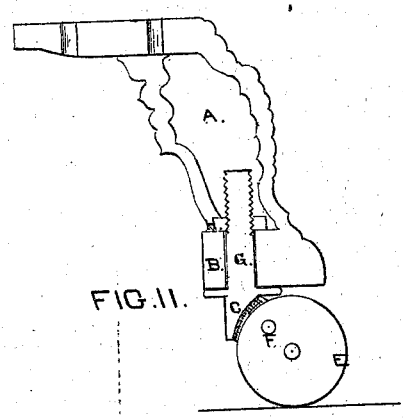
FIG. II.
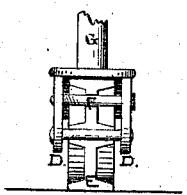
FIG. III.
INVENTOR:
Harriet A. Humphrey
WITNESSES:
Angeline H. Henning
Caroline W. Kellogg

UNITED STATES PATENT OFFICE.

HARRIET A. HUMPHREY, OF MILWAUKEE, WISCONSIN.

IMPROVEMENT IN CASTERS FOR STOVE-LEGS, &c.

Specification forming part of Letters Patent No. 115,322, dated May 30, 1871.

I, HARRIET A. HUMPHREY, of Milwaukee, in the State of Wisconsin, have invented certain Improvements in Stove-Legs with Caster, as described in the following specification.

*Nature and Object of the Invention.*

Its object is to furnish a caster adapted to stove-legs to facilitate the moving of stoves in households, and to make the caster perfectly stationary after the stove is rolled into position; and it consists in a screw-pin passing horizontally through the perforations in the arms and roller, to prevent the latter from turning, in combination with a nut applied to the stem, so that it may be reached from the outside of the leg to which it is applied, for the purpose of preventing said stem from rotating. And I hereby declare that the following is a full and exact description, reference being had to the accompanying drawing making a part of this specification.

Figure 1 is a side view in perspective. Fig. 2 is a vertical sectional view. Fig. 3 is a sectional view, showing the brake-screw.

In the drawing, A is a stove-leg which may be made to suit the pattern and size of any stove, and is to be fastened to the stove. B is a caster-socket cast with the leg, of sufficient thickness for strength. C is a caster, with perforations through the arms D and roller E to admit the screw F, which confines the roller, making it stationary. G, the stem of the caster, is made with spiral thread like a screw. H is a nut for the stem G, and is to be screwed firmly to the socket to prevent the caster from turning in its socket.

Whenever the stove is to be moved the nut H is to be loosened to allow the stem G to turn in its socket, and the screw F is to be withdrawn, thus relieving the roller.

*Claim.*

What I claim as new is—

The combination of pin F, roller E, and arms D, with the stem G and nut H, arranged in the open recess in the leg, substantially as and for the purpose set forth.

HARRIET A. HUMPHREY.

Witnesses:
  A. H. HENNING,
  CAROLINE W. KELLOGG.